United States Patent [19]

Lasermann et al.

[11] 4,326,824
[45] Apr. 27, 1982

[54] PROCESS FOR LONGITUDINAL ADJUSTMENT OF TOOLS

[75] Inventors: Franz Lasermann; Eduard Wittenbreder, both of Bielefeld, Fed. Rep. of Germany

[73] Assignees: Firma Droop, Bielefeld; Herr Dipl.-Ing. M. G. Dronsek, Klingen, both of Fed. Rep. of Germany

[21] Appl. No.: 152,993

[22] Filed: May 27, 1980

Related U.S. Application Data

[62] Division of Ser. No. 938,873, Sep. 1, 1978, abandoned.

[30] Foreign Application Priority Data

Sep. 2, 1977 [DE] Fed. Rep. of Germany ....... 2739533

[51] Int. Cl.$^3$ .......................... B23C 1/08; B23B 49/00
[52] U.S. Cl. .................................... 409/132; 408/1 R; 408/11; 408/13; 409/207; 409/213; 409/218
[58] Field of Search ............... 409/207, 213, 217, 218, 409/80, 186, 187, 192, 203, 131, 132; 408/1, 10, 11, 42, 31, 13, 16, 135; 33/185 R

[56] References Cited

U.S. PATENT DOCUMENTS

| | | | |
|---|---|---|---|
| 3,124,976 | 3/1964 | Pitiwood | 408/13 |
| 3,241,451 | 3/1966 | Williamson | 409/218 X |
| 3,280,449 | 10/1966 | Pever | 408/11 X |
| 3,481,247 | 12/1969 | Hayes | 409/218 |
| 3,614,909 | 10/1971 | Neuser | 409/218 X |
| 3,636,814 | 1/1972 | Esch | 409/218 |
| 3,684,939 | 8/1972 | Perry | 409/218 X |
| 3,995,528 | 12/1976 | Rethwish | 409/218 X |

FOREIGN PATENT DOCUMENTS 1957577 7/1970 Fed. Rep. of Germany ...... 409/218

*Primary Examiner*—William R. Briggs
*Attorney, Agent, or Firm*—Charles E. Baxley

[57] ABSTRACT

The present disclosure teaches a process and related apparatus for longitudinal adjustment of tools for individual working spindles of a multiple-spindle automatically controlled machine tool. The tools introduced into the working spindles in the direction of their lengths to be adjusted are run in rapid advance in all cases against a measuring device which, on reaching a predetermined distance from the working part reference point, produces a first signal in which the rapid advances of the working spindles are switched off individually. The first signal from the measuring device finally reached by the tool involved switches on crawling speeds for all working spindles. The spindles are switched off individually on reaching the working-part reference points in all cases by a second signal from the measuring devices.

5 Claims, 11 Drawing Figures

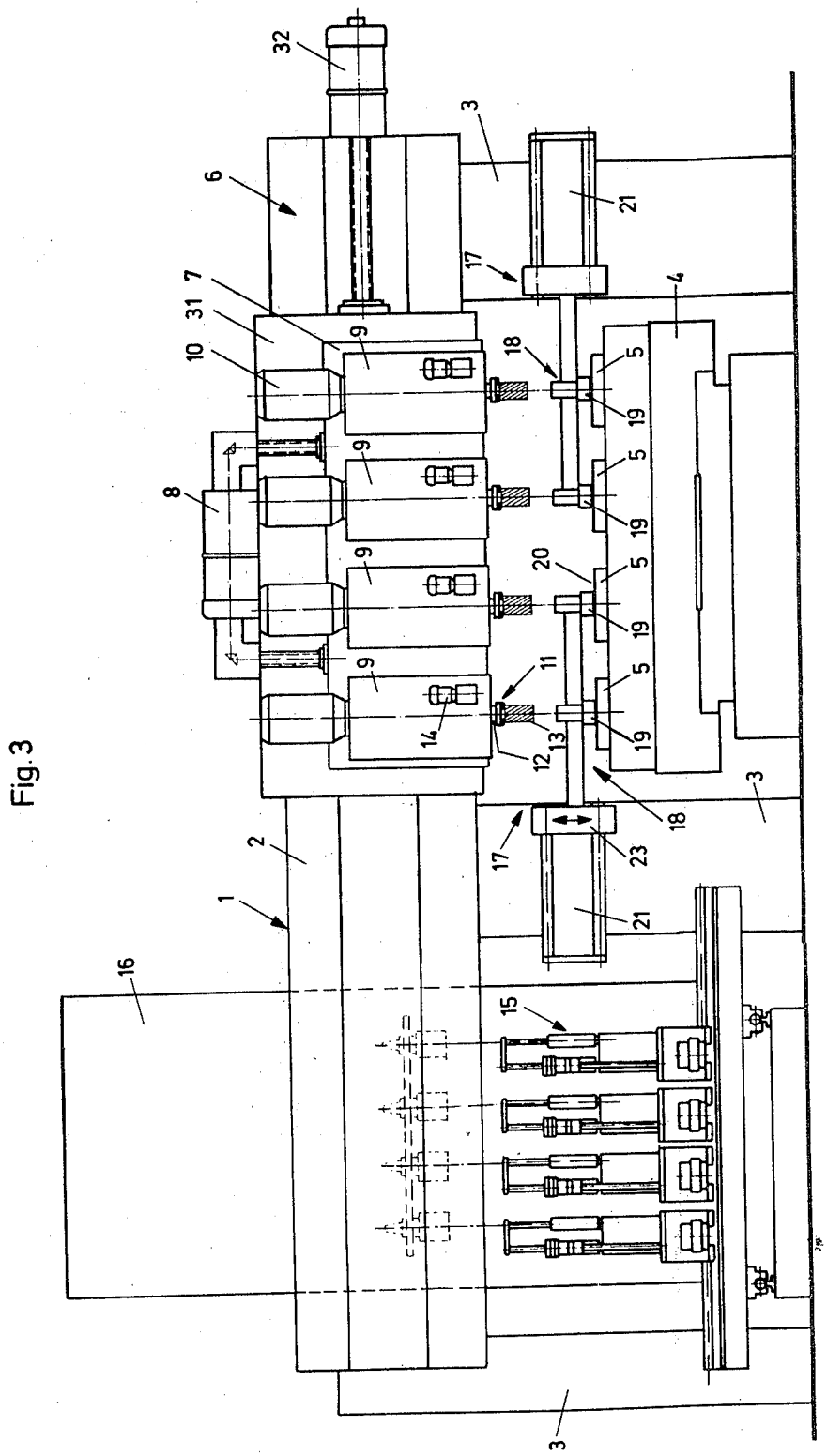

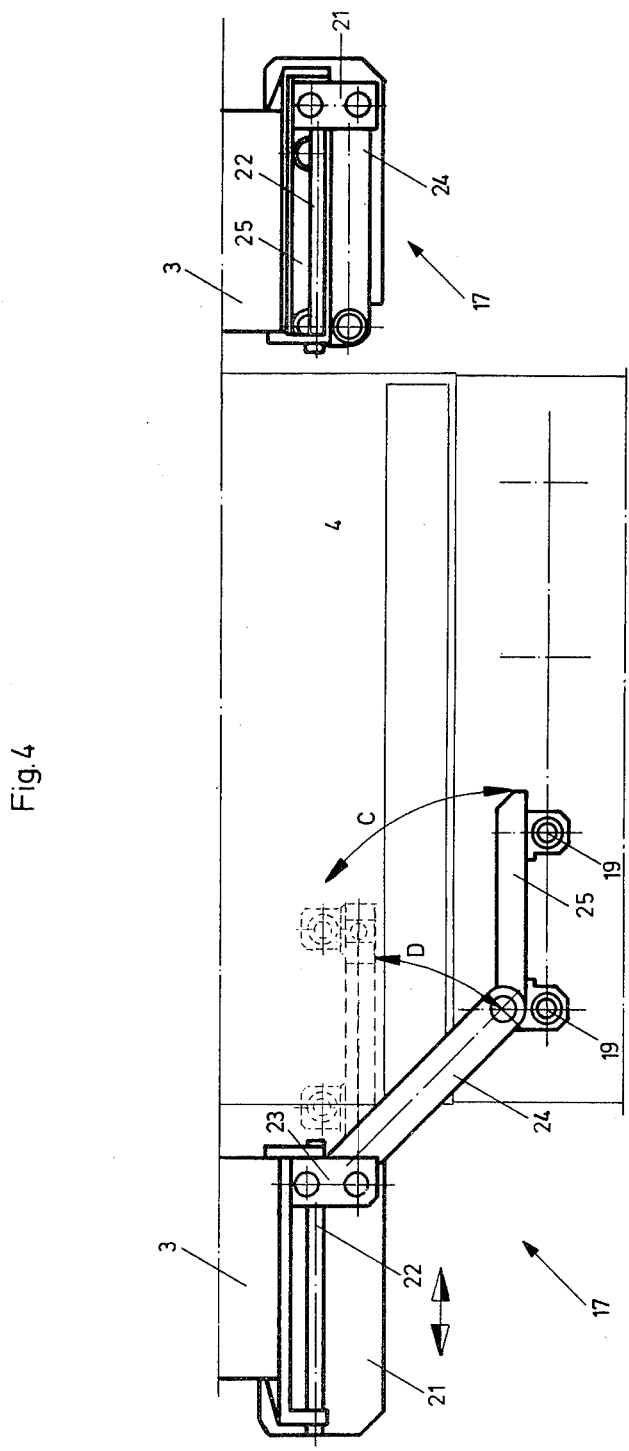

PROCESS FOR LONGITUDINAL ADJUSTMENT OF TOOLS

This is a division of application Ser. No. 938,873, filed Sept. 1, 1978, now abandoned.

BACKGROUND OF THE INVENTION

The invention related to a process for longitudinal adjustment of tools for individual working spindles of a multiple-spindle automatically controlled machine tool, in all cases on a working-part reference point as the zero point coordinate of a common processing program. The invention also relates to a device for using this process in a machine tool in which working spindles are arranged adjustably in the direction of their axes at the machine frame, and a working-part table is arranged therebelow.

In the case of numerically controlled multiple-spindle machine tools with simultaneously working work spindles, the problem arises on first introducing the tools or after each change in tools of having to adjust each of the working spindles individually to a zero-point coordinate of the common processing program. To be sure, essentially many equal tools are suitably introduced into the working spindles for simultaneous processing of the individual working parts, but in spite of a prior suitable selection these tools usually have differing lengths. Further, imprecision can arise in the holding devices for the tools whereby the individual working part reference surfaces do not exactly lie in the same plane. Different distances thus result between the lower edges of the tools and the tool reference surfaces in the starting position in which the tools are located in the program starting point and between the tools and the working parts. As these differences are considerably greater than machine processing tolerances as well as permissible measurement tolerances of finished processed working parts, special measures must be found in order to bring all the tools into a starting position with respect to the working-part reference point, which is then retained as the zero-point coordinate for the common processing program.

Determination of the zero point of a spatial coordinate system is known in the case of a milling machine for a working part clamped tightly to a machine table, in order then to bring the lower edge of the working part into a reference plane defined by coordinate axes by means of a measuring and indicating device whereby a zero-point correction is determined according to a certain scale and the tool is suitably forwarded to the working part (German Pat. No. 1,652,751). This mechanical adjustment of the tools by means of a special measuring and indicating device must be undertaken separately for each working spindle in the case of a multiple-spindle machine tool. This adjustment requires a considerable expenditure of time, which is not acceptable especially in the case of multiple-spindle machine tools with automatic tool exchange as well as where there are short tool-change times with frequent changes of tools, because the time advantage achieved by the automatic tool exchange again would be lost. In addition, errors can creep in during the forwarding of the individual tools in relation to the working part involved, whereby the known process is not substantially more reliable than is measuring the interval differences between the tools and the working-part reference points or surfaces by hand, as hitherto generally was done.

Furthermore, a device is known for obtaining tool-dependent correction values for positioning action of a numerically controlled machine tool, in which a known calibration position is provided in the position within the machine coordinate system in the form of a measuring stop which is startable and program-controlled by the tool (German Pat. No. 1,957,577). However, this device is suitable only for the precise positioning of a single tool, and it therefore cannot be transferred simply for all working spindles by multiplying for a multiple-spindle machine tool with a simultaneous processing program. Finally, it is very important in the case of such multiple-spindle machine tools particularly to consider the dependence of the control of the individual working spindles by way of common slides or swinging baskets.

The goal of the present invention therefore was to propose a process for the longitudinal adjustment of tools from individual working spindles of a multiple-spindle automatically controlled machine tool which, with working spindles controlled in dependence on each other, permits an automatic positioning (as simultaneously as possible) of the individual working spindles or the tools taken up by them in relation to the individual working-part reference points or surfaces. With a view to a high adjustment precision of the individual tool positions, the last runnings of the individual working spindles on switching off when the predetermined position is reached should be insignificantly small.

STATEMENT OF INVENTION

This task is solved in accordance with the invention in a process of the type mentioned at the outset whereby the tools introduced into the working spindles in the direction of their lengths to be adjusted are run in rapid advance in all cases against a measuring device which, on reaching a predetermined distance from the working-part reference point, produces a first signal in which the rapid advances of the working spindles are switched off individually, whereby the first signal from the measuring device finally reached by the tool involved switches on crawling speeds for all working spindles, which are switched off individually on reaching the working-part reference points in all cases by a second signal from the measuring devices.

The process in accordance with the invention is conducted on a machine tool in which the working spindles are arranged together at a slide movable along one of the axes of the machine and in which the working spindles individually have spindle sleeves adjustable in the axis direction, advantageously designed so that the tools are forwarded by a rapid advance of the slide until this rapid advance is switched off by the first signal from the measuring device first reached by the tool involved, and rapid advances of the spindle sleeves of the other tools are switched on, which are individually switched off by the first signals from the measuring devices in each case whereby, due to the first signal from the finally responding measuring device, the crawling speeds of the spindle sleeves are switched on until the individual tool reference points are reached.

In the case of a machine tool in which the working spindles are fixed to a swinging basket which is swingable around an axis passing vertically through all spindle axes and/or at which the working spindles are swingable in all cases perpendicularly to shafts standing on this axis, whereby the working spindles have spindle sleeves movable in the direction of their shafts, the process in accordance with the invention is executed advantageously so that, after a preliminary positioning of the swinging basket, the tools are forwarded in the direction of the spindle shafts by a rapid advance of the spindle sleeves until the rapid advances are switched off individually by the first signal from the measuring devices and crawling speeds of the spindle sleeves are switched on by the last of these signals until the individual tool reference points are reached.

In the process in accordance with the invention, it is also advantageous for the axis coordinate of the slide or swinging basket to be set at zero in the numerical control by the last second signal of the measuring device involved.

A further goal of the invention is the creation of a device for executing the process described with which the measuring devices can be introduced temporarily into the working area to position the individual working spindles at the multiple-spindle machine tool and to assume a preselectable distance from the reference points or surfaces of each working part in the measuring position.

This task is solved in a device of this type in accordance with the invention, whereby a mobile measuring device startable with the tools is arranged in alignment in the direction of the axes of each of the working spindles on the working-part table, on the tool-retention device, or on the working part itself.

BRIEF DESCRIPTION OF DRAWINGS

Further advantages of the invention will be seen from the claims which follow and from the description set forth below. The invention is illustrated in greater detail by the drawings and description of preferred embodiments. The drawings show the following:

FIGS. 1a–1c: the individual running positions on the machine after FIG. 1;

FIG. 3: view of a four-spindle gantry milling machine with a longitudinal adjustment device in accordance with the invention;

FIG. 4: top view of the longitudinal adjustment device of the machine in accordance with the invention after FIG. 3;

DESCRIPTION OF THE PREFERRED EMBODIMENTS

Figure 1:
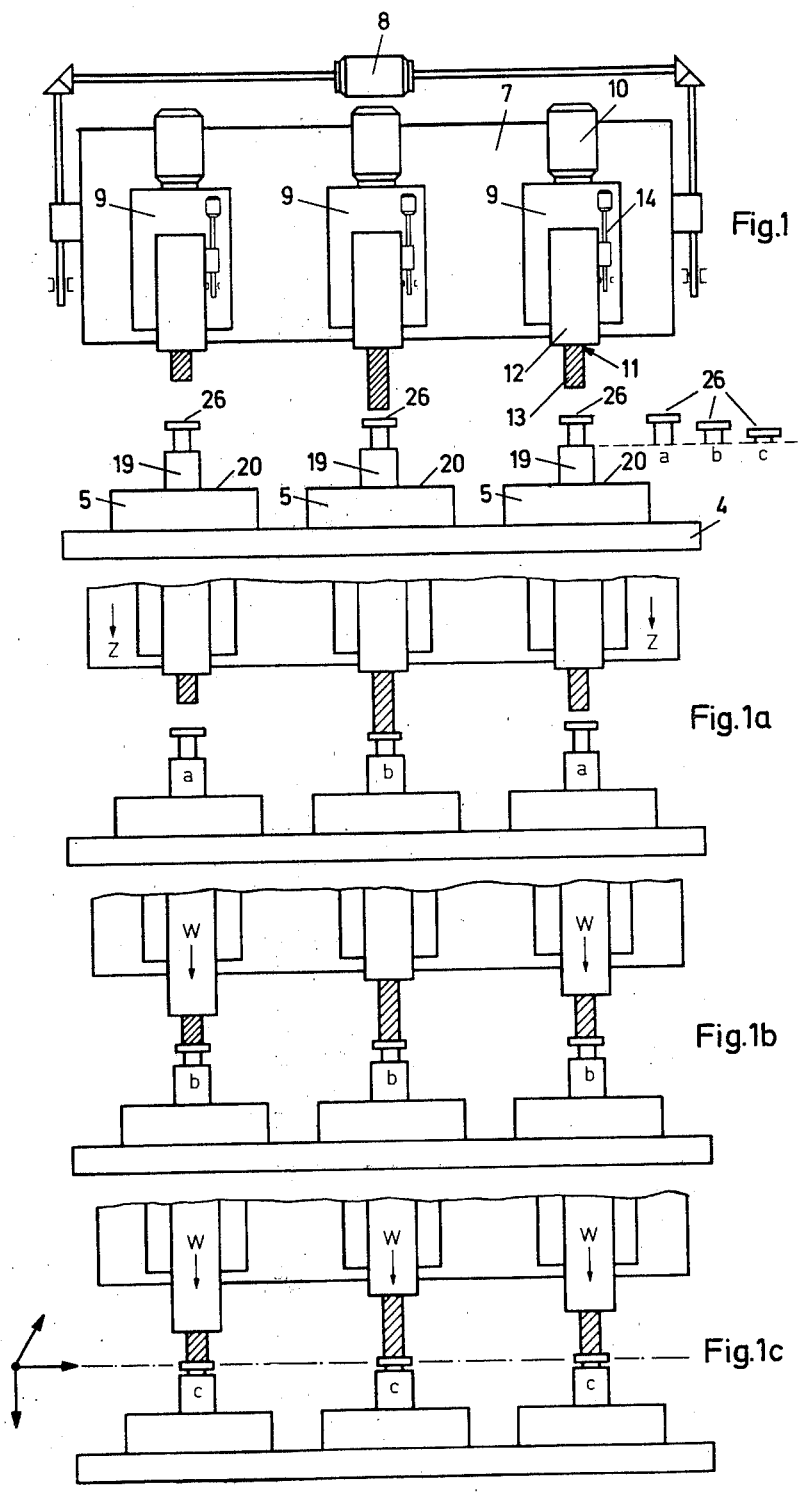
FIG. 1: to demonstrate the process in accordance with the invention, a schematic view of a multiple-spindle machine tool in which the individual working spindles are arranged on a common vertical slide.

FIG. 1 shows schematically the essential parts of a multiple-spindle gantry milling machine to demonstrate the process of the invention. A so-called "three-way" machine can be involved, in which relative movement between individual tools and the working parts takes place spatially in three axes located at right angeles to each other. Such a three-way machine is illustrated further below with the aid of FIG. 3. Several milling units 9 are arranged on a common slide 7, three of them in the shown embodiment. In the usual three-way machines of gantry design, slide 7 is movable in a vertical direction, thus in the direction of the so-called Z axis, and it can therefore also be called a Z slide. The pertinent Z drive 8 is indicated schematically above slide 7. The individual milling units 9 have drive 10 for driving each of working spindles 11 not represented in greater detail, and it is also seen that each working spindle 11 is designed as a spindle sleeve movable in Z direction. Spindle sleeves 12 are accordingly movable in a W direction superimposed with the Z direction. Spindle sleeve drive 14 is present laterally to milling unit 9 for each spindle sleeve 12. A milling tool 13 is inserted in the pickup of each working spindle 11, whereby distinct differences in length of individual tools 13 are shown for better visualization of the longitudinal adjustment of the individual tools of all working spindles 11.

Working parts 5 are fixed on a working-part table in FIG. 1, also not represented in detail, which in case of a gantry design of the milling machine is movable in a horizontal direction, thus in an X direction. Working parts 5 or their tension devices from individual working-part reference surfaces 20 at the top, whereby at the start of the simultaneous processing program the distance between the lower edges of individual tools 13 to the pertinent working-part reference surface 20 or a tool reference point determinable on it must be equal for all working spindles 11. It is not necessary for this purpose for the individual reference surfaces 20 of the working part, three of which are to be processed at the same time, for example, to lie in one plane. It is only necessary for the so-called zero-point coordinate for the numerically controlled processing program, to which the individual tools 13 of working spindles 11 are adjusted, to have the same relative position to the working parts in all cases. As is shown in FIG. 1, it is not possible to obtain the precise starting position of individual tools 13 at different lengths of tools 13 from individual working spindles 11 only by working Z slide 7.

Measuring devices 19 are set on reference surfaces 20 of the individual working parts, which for example have scanning surface 26 mechanically startable to tools 13 on their top. Measuring devices 19 can also have inductive or capacitive scanners which respond in the direction of surfaces 20 when a predetermined delivery position of individual tools 13 has been reached.

Three different positions of scanning surfaces 26 are presented in FIG. 1 on the dashed prolongation drawn to the right, which are of particular importance for controlling the individual advances of working spindles 11. Scanning surfaces 26 are in rest or starting position in position a. In position b of scanning surfaces 26, the measuring device 19 involved releases a "first" signal, and in position c of scanning surfaces 26 it produces a "second" signal. In position c, scanning surface 26 of each of measuring devices 19 assumes a fixed distance to individual working-part reference surfaces 20, which is included in the processing program of the machine. As soon as tool 13 pressing down scanning surface 26 of the measuring device 19 involved has reached position c of scanning surface 26, the tool is in the zero point of the coordinate system for the processing program. Care must therefore be taken for the forwarding movement of individual tools 13 to be stopped with as little delay as possible on reaching position c of scanning surfaces 26 of measuring devices 19 in all cases. On the other hand, to avoid time losses, this starting position must be reached as simultaneously as possible for all tools 13 in all working spindles 11.

After first setting tools 13 into the corresponding pickups of working spindles 11 or after each tool exchange, working spindles 11 are moved in the direction of the working part from a machine-specific reference point, whereby consideration is not yet given to the differences in length of individual tools 13. All working spindles 11 move away in rapid advance in Z direction at the same time until the tool 13 first affecting pertinent measuring device 19 presses scanning surface 26 down into position b. The common rapid advance of all working spindles 11 is effected over Z slide 7. As soon as the first responding measuring device 19 in position b of scanning surface 26 releases its "first" signal, the rapid advance of Z slide 7 is switched off. At the same time, this first signal of the first responding measuring device 19 is an order for switching on all spindle-sleeve rapid advances of the other working spindles 11, whose tools 13 have not yet pushed their pertinent scanning surfaces 26 of the other measuring devices 19 into position b. This moment is represented in FIG. 1a.

The forwarding movement of spindle sleeves 12 by spindle-sleeve drives 14 takes place in the so-called W direction, which is parallel to the Z direction. The spindle-sleeve rapid advances are switched off individually as soon as tool 13 has pressed its pertinent scanning surface 26 down into position b in all cases. At the moment when the last tool has reached position b with pertinent scanning surface 26, the last of the so-called "first" signals of measuring devices 19 at the same times gives the command for switching on the spindle-sleeve crawling movements for all working spindles 11. This moment is shown in FIG. 1b.

In the crawling movement of the spindle sleeves, all tools 13 now still pass through a residual interval until position c of scanning surfaces 26 has been reached. In this position of pertinent scanning surfaces 26 of each of measuring devices 19, the spindle-sleeve crawling movement of their pertinent working spindles 11 is switched off. Although the individual W crawling advances are switched off separately, all tools 13 almost simultaneously reach the working-part reference surface or working-part reference point as zero-point coordinate. In addition, the spindle-sleeve advances can be maintained almost free from last runnings in the crawling advance. A very high positioning precision of all tools 13 of the individual working spindles 11 on the working-part reference points or surfaces is therefore achieved. The corresponding movement is shown in FIG. 1c. On reaching the end position of tools 13, a signal is released to the automatic control to set the axis coordinate of the Z slide at zero, and the given starting point for all working spindles thereby is obtained in the establishment of the processing program.

Figure 2:
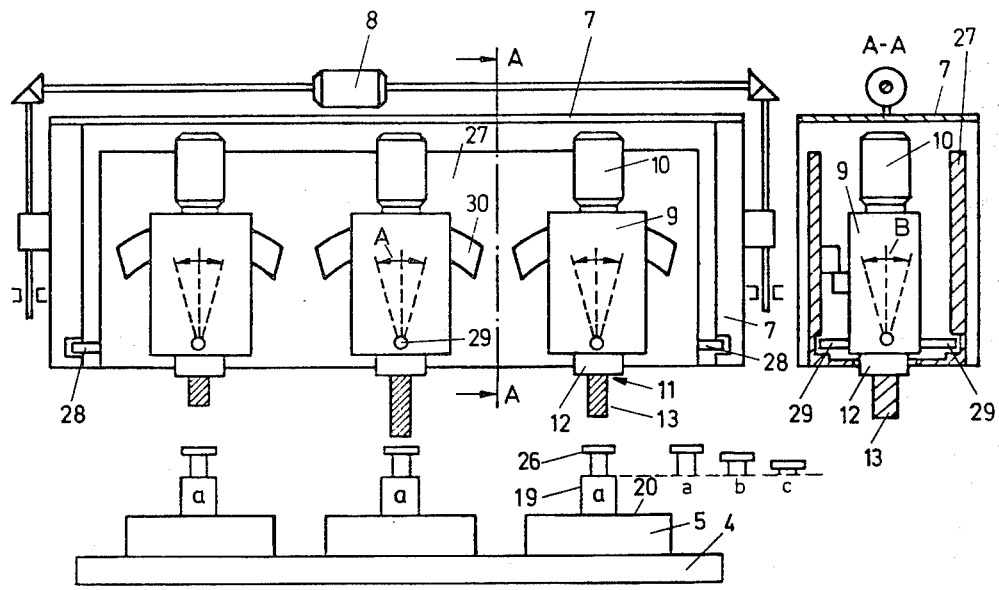
FIG. 2: to illustrate the process in accordance with the invention in a schematic representation, another form of execution of a multiple-spindle machine tool in which the individual working spindles are arranged in a so-called swinging basket.

FIG. 2 shows schematically the essential features of a four-axis or five-axis milling machine in which individual milling units 9 are movable not only in the way described in FIG. 1 but can also be swung around one or two axes.

For this purpose, Z slide 7 bears swinging basket 27, at which all milling units 9 can be tilted around an axis lying in the Z plane, the so-called B axis. For this purpose, swinging basket 27 is fixed to Z slide 7 in lateral swinging supports 28. In addition, each milling unit 9 can also be tilted around an axis vertical to the B axis, the so-called A axis, which accordingly is perpendicular to the Z plane. Consequently, the individual milling units 9 are stored in their own swinging supports 29 in the swinging basket, as is especially shown in the lateral section along line A—A in FIG. 2. In addition, swinging basket 27 also has swinging guides 30 above swinging supports 29 for each of milling units 9. The double swinging mobility of milling units 9 is made clear by arrows A and B, and the swinging angle is indicated by broken lines.

The mobility of milling units 9 after FIG. 2 in the other machine axes is produced as in the designs after FIGS. 1 and 3, whereby Z slide 7 is arranged on Y slide 31 movable obliquely to it (FIG. 3), and working-part table 4 is movable along an axis again perpendicular to it, the X axis. It is necessary for the use of the process in accordance with the invention for the distance from the swinging axes, thus the A axis and the B axis, to the lower edge of the tool or to the working-part reference plane or to the working-part reference point to be determined, and accordingly it may not be changed. A delivery by way of Z slides 7 is therefore excluded for the longitudinal adjustment of tools 13 after the execution example in FIG. 2. The longitudinal correction of tools 13 can only be undertaken with the use of spindle-sleeve advances.

Figure 2A:
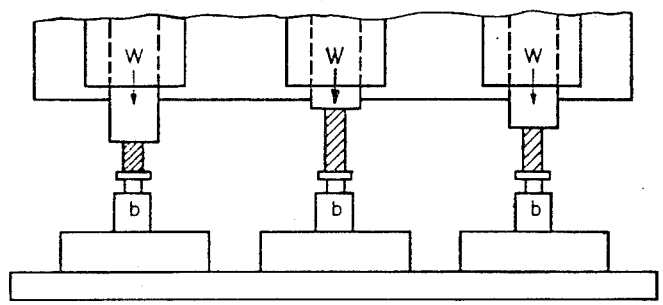
FIGS. 2a,2b: the individual running positions of the machine after FIG. 2.

Milling units 9 are first run in a starting position which is determined by a prior program, for example, and in which the different lengths of tools 13 introduced into individual working spindles 11 are not yet considered. In this starting position, the distance from the lower edge of the longest tool to the scanning surface of the measuring device involved is selected so that, starting from the upper spindle-sleeve position, forwarding reserves are still present for the longitudinal determination of all working spindles. The spindle-sleeve rapid advances of all working spindles 11 are then started up and are separately switched off by the first signal from measurement devices 19 in position b of scanning surfaces 26 involved in all cases. The switching-off point for the last responding measurement device 19 in position b of the pertinent scanning surface 26 is shown in FIG. 2a.

Figure 2B:
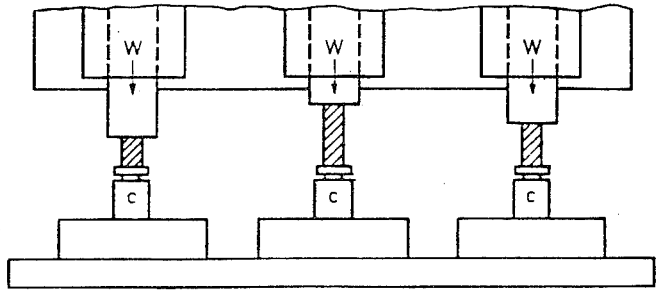

The crawling advances of the spindle-sleeve movements are then switched on by the "first" signal of the last responding measuring device 19. As soon as the individual tools have pressed scanning surfaces 26 into position c, the switching off of the spindle-sleeve crawling movement takes place individually for each working spindle 11. FIG. 2b shows the end positions of the spindle sleeves in the direction of their W axes after reaching the working-part reference point by the lower edges of the individual tools 13. In this position, the swinging axes of individual milling units 9 have equal distances to the working-part reference points in the given cases. When the end position of tools 13 is reached, a signal is given to numerical control to set the axis coordinate of the Z slide at zero, and the starting point of all working spindles given in the establishment of the processing program is thereby achieved.

FIG. 3 shows the overall arrangement of a four-spindle gantry milling machine which is set up for a tool length correction in accordance with the invention.

The machine has frame 1, which includes an arm or gantry 2 which rests on three gantry supports 3. Working-part table 4, which is movable vertically to gantry 2 in the direction of the X axis of the machine, is arranged between two of gantry supports 3. Four working parts 5 are fixed by means of fixing devices which are not represented in detail to working-part table 4; they are to be processed simultaneously by four tools in a common program.

Gantry 2 has crossrail 6, on which slide 31 is movable. The direction of movement of slide 31 lies in the so-called Y axis, and it can therefore be called the Y slide. The Y axis usually stands perpendicularly to the X axis, in which working-part table 4 is movable. Y slide 31 is moved by Y drive 32. Another slide 7 is arranged on Y slide 31, which is movable in a vertical direction. This direction is usually called the Z direction. It is perpendicular to both the Y axis and the X axis. Z drive 8, which is arranged above on slide 7, serves for moving Z slide 7. Z slide 7 and Y slide 31 form a crossover support for individual milling units 9 on Z slide 7, each having milling drive 10 for working spindle 11. Working spindles 11 are designed as movable spindle sleeves, so that the adjustment devices of spindle sleeves 12 lie parallel to the Z axis and are usually called W axes. Each of milling units 9 has its own spindle-sleeve drive 14. Tools 13 rest in pickup devices of working spindles 11 which are not represented in detail and which are indeed similar for simultaneous processing of individual working parts 5, but they can be of different lengths, for example due to wear.

Tools 13 for all four working spindles 11 are stored in tool-storage unit 16 and can be exchanged in spindles 11 by means of tool-changing device 15.

Both after the first introduction of tools 13 and after each tool exchange, a length correction must be made in order to establish equal distances of the undersides of tools 13 to reference surfaces 20 of working parts 5 on working-part table 4 in all cases. Length adjustment device 17, which can temporarily be swung into the working areas of individual working spindles 11, can serve for this purpose.

Length adjustment device 17 accordingly consists of two arms 18 which are fixed on gantry supports 3 near working-part table 4. Each of arms 18 is arranged for the two neighboring spindles 11 and bears two measuring devices 19 which are lowered in measurement position onto the working-part reference surfaces 20 and are arranged in alignment with working spindles 11. The arms are swingable for this purpose not only in a horizontal plane but can also be adjusted for height in order to be able to deposit measuring devices 19 onto working-part reference surfaces 20. It is suitable for their entire swinging direction 21 to be arranged adjustable for height on gantry supports 3. The design of length-adjustment device 17 is shown in detail in FIG. 4. Arms 18 each consist of inner swinging arm 24, which is fixed by its inner end to lifting unit 23, and outer arm 25 which is supported at the outer end of inner swinging arm 24. Outer swinging arm 25 bears measurement devices 19 at the distance of the working spindles 11 of the milling machine. Measuring devices 19 are suitably arranged projecting at a longitudinal side of outer swinging arm 25 in order for this swinging arm 25 to strike against inner swinging arm 24 with its other longitudinal side, and/or it can be depressed into it. In the latter case, inner swinging arm 24 has a hollow profile which can surround outer swinging arm 25. The swinging mobility of outer swinging arm 25 with respect to inner swinging arm 24 is indicated by arrow C in FIG. 4. The swinging movement of inner swinging arm 24 takes place in the direction of arrow D. Lifting unit 23 is movable on straight guide 22 in the direction of the connecting line of working spindles 11 or in a direction parallel thereto. The length of guide 22, which corresponds to the stroke of lifting unit 23, is about equal to the length of inner swinging arm 24.

The total arrangement of length-adjusting device 17 makes possible on the one hand a precise positioning of measuring devices 19 in measurement position and on the other a space-saving housing of folded arm 18 in rest position. The swung-out position of arm 18 is represented at the left in FIG. 4, whereas for example the right arm is presented in FIG. 4 in rest position.

The moving of swung-out arm 18 from folded position takes place by first striking swinging outer arm 25 at the swinging support located at the outer end of the inner swinging arm 24 against this inner swinging arm. After that, inner swinging arm 24 with outer swinging arm 25 lying within it are swung in the direction of arrow D into a position parallel to guide 22. The lifting unit with inner and outer swinging arms 24 and 25 are then moved outwards, i.e., away from working-part table 4. Guide 22 is designed so that it is not in the way of possibly protruding measuring devices 19 of retracted swinging arm 25 in this movement. The overall swinging device 21 with guide 22 arranged on it and lifting unit 23 can be designed as vertical slides supported on the gantry support 3 involved.

Figure 5:
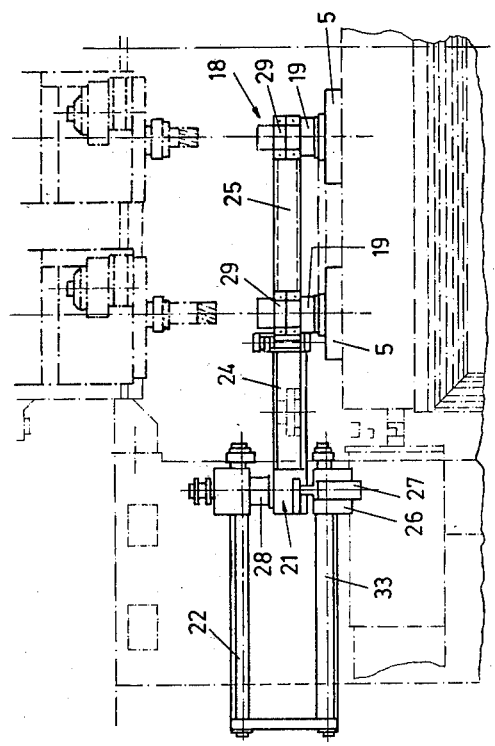
FIG. 5: front view of the longitudinal adjustment of the machine in accordance with the invention after FIG. 3.

Further details on the mounting of arm 18 of length-adjustment device 17 are shown in FIG. 5. For the height adjustment of arm 18, the entire swinging unit 21 is fixed on post 28 and moreover is acted on by piston 27 which works with cylinder 33 arranged above or below swinging unit 21. Swinging unit 21 and accordingly arm 18 can be moved in vertical direction on guide post 28 above piston 27.

Each of measuring devices 19 is suitably stored in support ring 29 on arm 18. Measuring devices 19 are hung up feathering in vertical position inside this support ring 29, as is shown in detail in FIG. 6. Measurement devices 19 are arranged about concentrically in circular support rings 29 of arm 18 and are there secured by rubber element 30 which has an elasticity sufficient so that measuring devices 19 are stored flexibly in vertical direction, i.e., in the axial direction of support ring 29. Measuring devices 19 have three attachment points 34 below which are suitably spaced along the lower circumferential edge 120° from each other and which are set on working-part reference surface 20 in measurement position. In this position, pertinent arm 18 is no only lowered by height-adjustment device 26, 27 to a suitable height for mounting support for measuring devices 19, but in addition it is driven somewhat still lower in order to press measuring devices 19 against working-part reference surface 20 over rubber element 30.

Figure 6:
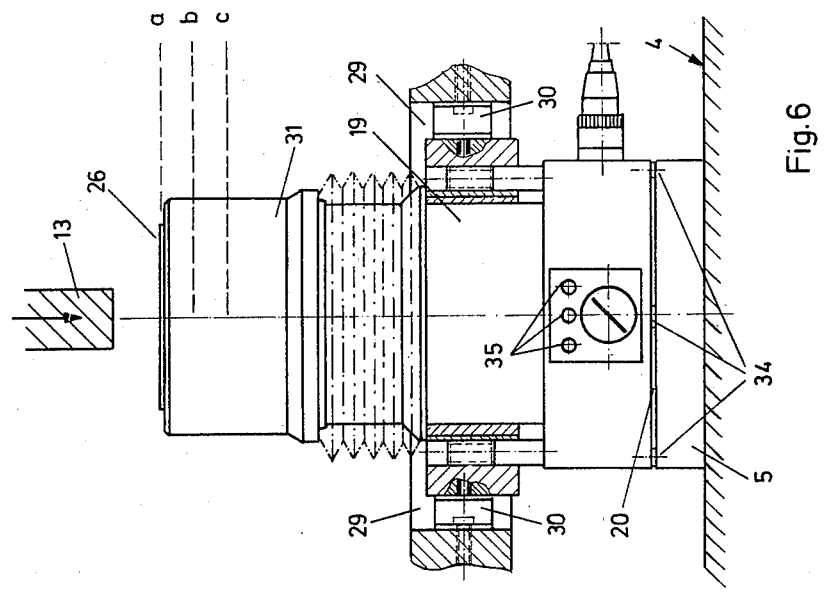
FIG. 6: a partial section through the longitudinal adjustment device in the vicinity of one of the measuring devices.

FIG. 6 also shows that displaceable upper part 31 is present opposite the main part of measuring devices 19, on whose upper side scanning surface 26 for pertinent tool 13 is carried. This scanning surface 26 assumes individual positions a, b and c together with the displaceable upper part 31 of measuring devices 19, as was explained above. In addition, FIG. 6 shows three signal lamps 35 on the fixed part of measuring devices 19, over which the above mentioned positions a, b and c of upper part 31 of scanning surface 26 of measuring devices 19 are indicated.

It will be apparent to those skilled in the art to which this invention pertains most closely that various deviations may be made from the foregoing preferred embodiments, without departing from a main theme of invention set forth in the following claims.

We claim:

1. A process for longitudinal adjustment of tools each in one of a plurality of individual working spindles of a multiple-spindle automatically controlled machine tool, from a respective working-part reference point established through respective measuring devices as a zero-point coordinate of a common processing program; the process characterized in that the tools are introduced into their respective working spindles in the direction of the individual tool lengths to be adjusted and are run in rapid advance in all cases against a respective measuring device in which the first of the tools on reaching a predetermined distance from the working-part reference point produces a first signal in which the rapid advances of the remaining spindles are stopped individually, whereby the first signal from the measuring device last reached by the tool involved switches on crawling speeds for all of the working spindles, each to produce a second signal on reaching the working-part reference points which working spindles are individually stopped on reaching the working-part reference points by the second signal from the measuring devices whereby the plurality of tools and their respective spindles are adjusted to the zero point coordinate of the common processing program.

2. A process for longitudinal adjustment of each of a plurality of tools of a machine tool in which working spindles each individual to a respective one of the tools are arranged together at a slide moveable along an axis of the machine and in which the working spindles individually have spindle sleeves adjustable in axial direction; the process characterized further in that the tools are forwarded toward respective measuring devices by a rapid advance of the slide until this rapid advance is switched off by the first signal from the measuring device first reached by the tool involved, and rapid advances of the spindle sleeves of the other tools are switched on, which are individually switched off by the first signals from the measuring devices in each case whereby, due to the first signal from the last responding measuring device, the crawling speeds of the spindle sleeves are switched on until the individual tool reference points are reached whereby the tools and their respective spindles are adjusted to the zero point coordinate of the common processing program.

3. A process for longitudinal adjustment of each of a plurality of tools of a machine tool in which working spindles each individual to a respective one of the tools are fixed to a swinging basket which is swingable around an axis passing vertically through all spindle axes and at which working spindles are swingable in all cases perpendicularly to shafts standing on said axis, whereby the working spindles have spindle sleeves moveable in the direction of their shafts; the process characterized further in that, after a prepositioning of the swinging basket, the tools are forwarded toward respective measuring devices in the direction of the spindle shafts by a rapid advance of the spindle sleeves until the rapid advances are individually switched off by the first signal from the measuring devices and crawling speeds of the spindle sleeves are switched on by the last of these signals until the individual tool reference points are reached whereby the tools and their respective spindles are adjusted to the zero point coordinate of the common processing program.

4. The process in accordance with claim 3, characterized further in that the axis coordinate is set at zero in the automatic control by the last second signal of the measuring device involved.

5. A process for longitudinal adjustment of individual tools in their working spindles in a multiple-spindle automatically controlled tool machine to a respective working part reference point as a zero-point coordinate of a common processing program, whereby the working spindles are parallel with and are controlled relative to a common axis in their respective axial movements toward the zero-point coordinate by means of a process characterized in that the working spindles are commonly adjusted in the direction of the common axis to a pre-position with respect to the working part reference point, then the tools set into the working spindles are adjusted individually in the direction of the individual lengths in a respective axis parallel with the common axis and are run in rapid advance against a respective measuring device producing a first signal upon the respective tool reaching a predetermined distance from the working part reference point, said first signal stopping the individual rapid advances of the other working spindles, whereby the first signal from the measuring device last reached by the tool involved switches on crawling speeds for all of the working spindles and wherein each of the measuring devices produces a second signal on reaching the working part reference point zero-point coordinate by the tool involved, whereby the working spindles are stopped individually by said second signals and the starting point for all working spindles thereby is obtained for the common processing program.

* * * * *